United States Patent
Kanteti et al.

(10) Patent No.: US 11,194,496 B2
(45) Date of Patent: *Dec. 7, 2021

(54) DATA DEDUPLICATION USING KVSSD

(71) Applicant: Samsung Electronics Co., Ltd., Suwon-si (KR)

(72) Inventors: Kumar Kanteti, Mountain View, CA (US); Vishwanath Maram, San Jose, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

This patent is subject to a terminal disclaimer.

(21) Appl. No.: 16/718,173

(22) Filed: Dec. 17, 2019

(65) Prior Publication Data

US 2020/0125283 A1 Apr. 23, 2020

Related U.S. Application Data

(63) Continuation of application No. 15/825,062, filed on Nov. 28, 2017, now Pat. No. 10,545,696.

(Continued)

(51) Int. Cl.
*G06F 3/06* (2006.01)

(52) U.S. Cl.
CPC .......... *G06F 3/0641* (2013.01); *G06F 3/0608* (2013.01); *G06F 3/0619* (2013.01);
(Continued)

(58) Field of Classification Search
CPC .... G06F 3/0641; G06F 3/0644; G06F 3/0673; G06F 3/0619; G06F 3/065; G06F 3/0652; G06F 3/067; G06F 17/0619

See application file for complete search history.

(56) References Cited

U.S. PATENT DOCUMENTS 6,084,877 A * 7/2000 Egbert ............... H04L 45/745
                                                    370/389
6,249,521 B1 * 6/2001 Kerstein ............ G06F 13/1605
                                                    370/389

(Continued)

FOREIGN PATENT DOCUMENTS

| CN | 102591855 A | 7/2012 |
| CN | 102598020 A | 7/2012 |
| CN | 106202548 A | 12/2016 |

OTHER PUBLICATIONS

David Geer, "Reducing the Storage Burden via Data Deduplication", IEEE Computer Society, Industry Trends, Dec. 2008, pp. 15-17, https://ieeexplore.ieee.org/stamp/stamp.jsp?tp=&arnumber=4712493&tag=1 (Year: 2008).*

(Continued)

*Primary Examiner* — Christopher D Birkhimer
(74) *Attorney, Agent, or Firm* — Renaissance IP Law Group LLP

(57) ABSTRACT

Deduplication functionality is provided for a key-value solid-state drive (KVSSD) that includes a storage space and a controller. The storage space contains first and second containers. The first container includes a first virtual space and stores a key and at least one dedup key associated with the key. Each dedup key corresponds to a block of user data, and each block includes a predetermined size. The second container includes a second virtual space and stores each dedup key, the block of user data associated with the dedup key and metadata associated with the block of user data. The controller determines whether a block of user data received by the KVSSD is a duplicate block of data stored in the second container by determining whether a dedup key for the received block of user data matches a stored dedup key in the first container.

20 Claims, 3 Drawing Sheets

Related U.S. Application Data

(60) Provisional application No. 62/586,122, filed on Nov. 14, 2017.

(52) U.S. Cl.
CPC .......... *G06F 3/0644* (2013.01); *G06F 3/0673* (2013.01); *G06F 3/0679* (2013.01)

(56) References Cited

U.S. PATENT DOCUMENTS

| | | | | |
|---|---|---|---|---|
| 6,292,483 | B1* | 9/2001 | Kerstein | G06F 13/1605 370/389 |
| 8,127,109 | B2* | 2/2012 | Matze | G06F 11/1453 711/216 |
| 8,295,486 | B2* | 10/2012 | Bender | H04L 9/3247 380/270 |
| 9,015,486 | B2* | 4/2015 | Bender | H04W 12/1006 713/170 |
| 9,405,482 | B2* | 8/2016 | Varadharajan | G06F 16/122 |
| 9,436,596 | B2 | 9/2016 | Sengupta et al. | |
| 9,454,538 | B2* | 9/2016 | Noronha | G06F 3/0608 |
| 9,483,489 | B2* | 11/2016 | Varadharajan | G06F 16/176 |
| 9,485,311 | B2* | 11/2016 | Kripalani | G06F 3/0605 |
| 9,619,339 | B2* | 4/2017 | Kumarasamy | G06F 11/1456 |
| 9,659,047 | B2 | 5/2017 | Sharma et al. | |
| 9,665,305 | B1* | 5/2017 | Natanzon | G06F 3/0608 |
| 9,705,730 | B1* | 7/2017 | Petri | G06F 3/0641 |
| 9,715,434 | B1* | 7/2017 | Xu | G06F 11/1453 |
| 9,792,042 | B2* | 10/2017 | Chen | G06F 3/0641 |
| 2008/0294696 | A1* | 11/2008 | Frandzel | G06F 3/0608 |
| 2009/0089584 | A1* | 4/2009 | Bender | H04L 9/3247 713/176 |
| 2009/0234892 | A1* | 9/2009 | Anglin | G06F 11/1453 |
| 2009/0271454 | A1* | 10/2009 | Anglin | G06F 16/2365 |
| 2010/0205163 | A1* | 8/2010 | Eshghi | G06F 11/1453 707/698 |
| 2010/0250896 | A1* | 9/2010 | Matze | G06F 3/0674 711/216 |
| 2011/0055471 | A1 | 3/2011 | Thatcher et al. | |
| 2011/0276543 | A1* | 11/2011 | Matze | G06F 3/0641 707/692 |
| 2012/0317353 | A1* | 12/2012 | Webman | G06F 3/0613 711/108 |
| 2013/0007454 | A1* | 1/2013 | Bender | H04W 12/1006 713/170 |
| 2014/0181438 | A1 | 6/2014 | Varadharajan et al. | |
| 2016/0162218 | A1 | 6/2016 | Callaway et al. | |
| 2016/0306558 | A1* | 10/2016 | Varadharajan | G06F 3/065 |
| 2016/0334995 | A1* | 11/2016 | Kumarasamy | G06F 16/21 |
| 2017/0090772 | A1* | 3/2017 | Kripalani | H04L 67/1097 |
| 2017/0090795 | A1* | 3/2017 | Varadharajan | G06F 3/067 |
| 2017/0115907 | A1* | 4/2017 | Kumarasamy | G06F 16/119 |
| 2017/0118285 | A1* | 4/2017 | Kripalani | G06F 3/0685 |
| 2017/0160969 | A1* | 6/2017 | Kumarasamy | G06F 16/21 |
| 2017/0177271 | A1* | 6/2017 | Vijayan | G06F 3/0608 |
| 2017/0257254 | A1* | 9/2017 | Petri | G06F 3/067 |
| 2017/0308320 | A1 | 10/2017 | Sharma et al. | |

OTHER PUBLICATIONS

Jin, Yanqin et al., "KAML: A Flexible, High-Performance Key-Value SSD", 2017 IEEE International Symposium on High Performance Computer Architecture, (https://ieeexplore.ieee.org/stamp/stamp.jsp?tp=&arnurnber=7920840), May 8, 2017, pp. 373-384.

Notice of Allowance for U.S. Appl. No. 15/825,062, dated Sep. 18, 2019.

Office Action for U.S. Appl. No. 15/825,062, dated May 2, 2019.

* cited by examiner

DATA DEDUPLICATION USING KVSSD

CROSS-REFERENCE TO RELATED APPLICATION

This application is a continuation of U.S. patent application Ser. No. 15/825,062, filed Nov. 28, 2017, which claims the priority benefit under 35 U.S.C. § 119(e) of U.S. Provisional Patent Application No. 62/586,122, filed on Nov. 14, 2017, the disclosure of which is incorporated herein by reference in its entirety.

TECHNICAL FIELD

The subject matter disclosed herein generally relates to key value solid-state drive (KVSSD) systems, and more particularly, to a KVSSD that provides deduplication functionality.

BACKGROUND

Data deduplication is an intelligent compression technique that reduces storage costs by eliminating duplicate copies of data. Data deduplication may be used to improve storage utilization. During a deduplication process, unique segments of data are identified and stored on disk. A hashing function generates a checksum on the unique segment of data, and the checksum are stored in a table. The checksum table is referred to herein as a dictionary or dedup dictionary. Before data is written to a disk, the dedup dictionary is consulted to determine whether there is a duplicate of the data that is to be written.

Several techniques and optimizations may be used to maintain a dedup dictionary. Some of the conventional techniques include a dedup dictionary that has a preallocation of the amount of memory used by the dictionary. A disadvantage of this technique is that the lookups into the dictionary are limited to the amount of memory that has been reserved, and as a data set grows, the dictionary may exceed the reserved memory. Another conventional technique is to use flash memory for data deduplication. This conventional technique, however, may require deduplication logic to do several input/output (I/O) operations to the flash memory to determine whether the dedup library contains a duplicate key, and a central processing unit (CPU) is needed to generate the hash. Both conventional techniques add to the latency of I/O operations in the form of multiple reads and writes when there are no collisions. If the data has not ever been written to the disk, then determining the hash and writing the data to the disk involves additional I/O operations.

SUMMARY

An example embodiment provides a key-value solid-state drive (KVSSD) that may include a storage space and a controller. The storage space may contain a first container and a second container. The first container may include a first virtual space within the storage space in which the first container may store a key and at least one dedup key associated with the key, each dedup key may correspond to a block of user data, and each block may be a predetermined size, which may be user selectable. The second container may include a second virtual space within the storage space in which the second container may store each dedup key, the block of user data associated with the dedup key and metadata associated with the block of user data. The controller may determine whether a block of user data received by the KVSSD for storage in the storage space is a duplicate block of data stored in the second container by determining whether a dedup key for the received block of user data matches a stored dedup key in the first container. In one embodiment, the KVSSD may include a plurality of first containers and a plurality of second containers. In another embodiment, the controller may further generate each dedup key for each block of user data based on a user selectable hashing function.

Another example embodiment provides a deduplication method for use on a key-value solid-state drive (KVSSD), in which the method may include storing in a first container in the KVSSD a key and at least one dedup key associated with the key in which the first container may include a first virtual space within a memory space of the KVSSD, each dedup key may correspond to a block of user data, and each block may be a predetermined size, which may be user selectable; storing in a second container in the KVSSD each dedup key the block of user data in association with the dedup key for the block of user data and metadata associated with the block of user data in which the second container may include a second virtual space within the memory space of the KVSSD; and determining whether a block of user data received by the KVSSD is a duplicate block of data stored in the second container by determining whether a dedup key for the received block of user data matches a stored dedup key in the first container. If the dedup key for the received block of user data matches a stored dedup key in the first container, the metadata associated with the block of user data corresponding to the dedup key is updated in the second container to indicate a number of references to the stored block of user data. If the dedup key for the received block of user data does not match a stored dedup key in the first container, the dedup key for the received block of user data is store in the first container and the dedup key for the received block of user data, the received block of user data and metadata associated with the received block of user data is stored in the second container. The determining whether the block of user data received by the KVSSD is a duplicate block of data stored in the second container is performed internally to the KVSSD.

Still another example embodiment provides a deduplication method for use on a key-value solid-state drive (KVSSD) in which the method may include determining whether a block of user data received by the KVSSD is a duplicate block of data stored in the KVSSD by determining whether a dedup key for the received block of user data matches a stored dedup key in a first container in the KVSSD in which each dedup key may correspond to a block of user data stored in a second container, each block may include a predetermined size, which may be user selectable, in which the first container and the second container each may include a separate virtual space within a memory space of the KVSSD, each block of user data stored in the second container may be stored in association with the dedup key for the block of user data and metadata corresponding to the block of user data; if the dedup key for the received block of user data matches a stored dedup key in the first container, updating in a second container stored metadata associated with the block of user data corresponding to the stored dedup key to indicate a number of references to the stored block of user data; and if the dedup key for the received block of user data does not match a stored dedup key in the first container, storing in the first container the dedup key for the received block of user data and storing in the second container the dedup key for the received block of user data, the received block of user data and metadata associated with the received block of user data.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1A:
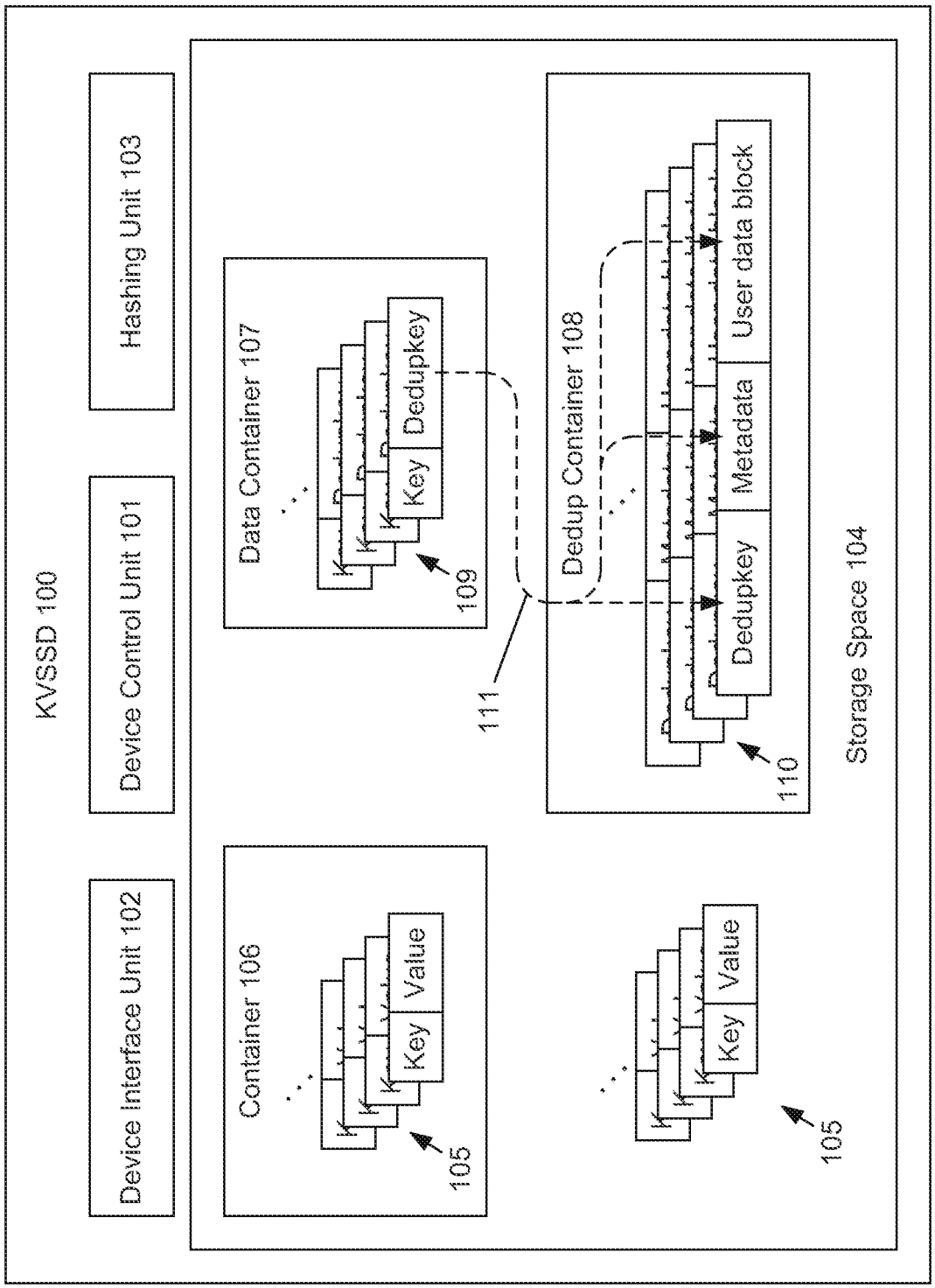
FIG. 1A depicts a block diagram of an example embodiment of a functional system arrangement of a KVSSD that provides deduplication functionality according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The subject matter disclosed herein provides a system and a method for performing data deduplication (dedup) using a key-value solid-state drive (KVSSD). Data may be organized into sets of key-value pairs that may be stored in virtual storage spaces, referred to herein as containers, in the KVSSD. A size of a container may be user selectable and may be as large as an entire storage space of a KVSSD although that would mean the storage space of the KVSSD would only include one container. Each container may hold, or store, key-value-type pairs. The keys in a container are unique to that container, which means that there are no duplicate keys within a container. Two different containers, however, may have the same key. That is, a key may be repeated between two different containers. A user or a system administrator may enable a deduplication process on a container, and also may selectively set a hashing function for detecting block collisions so that data blocks are automatically deduplicated when data is written to or updated within a container.

FIG. 1A depicts a block diagram of an example embodiment of a functional system arrangement of a KVSSD 100 that provides deduplication functionality according to the subject matter disclosed herein. The KVSSD 100 may include a device control unit 101, a device interface unit 102, a hashing unit 103, and a storage space 104. The device control unit 101 operatively controls the device interface unit 102, the hashing unit 103 and the storage space 104. In one embodiment, the device control unit 101 may be, but is not limited to, a central processing unit (CPU), a finite state machine (FSM), or an embedded controller. The device controller 101 may also include other components that are not shown in FIG. 1A, such as, but not limited to random-access memory (RAM), read-only memory (ROM), etc. The system configuration of the KVSSD 100 enables the KVSSD 100 to provide deduplication functionality completely internal to the KVSSD 100.

The device interface unit 102 provides interface functionality to receive user data and/or commands and input/output (I/O) requests from a host device (not shown), and to output user data and/or status information in response to received commands and/or I/O requests. The hashing unit 103 generates deduplication keys (dedupkeys) in response to control commands received from the device control unit 101. The storage space 104 may include non-volatile physical storage devices (not specifically shown) that are configured to store information, such as, but not limited to, user data, keys, dedupkeys, metadata, error information and status information. The non-volatile physical storage devices may be, but is not limited to, non-volatile random access memory (NVRAM), Flash memory, disk storage, resistive random-access memory (ReRAM), phase-change memory (PRAM), or magnetic RAM (MRAM).

The storage space 104 may be configured to store user data in a key/value arrangement 105 directly in the storage space 104. Additionally or alternatively, the storage space 104 may configured to include one or more general containers 106 (of which only one general container 106 is indicated), and one or more data containers 107 with an associated deduplication container (dedup container) 108 (of which only one data container 107 and one dedup container 108 are indicated). The functional arrangement between a data container 107 and a dedup container 108 provides a deduplication functional arrangement as described herein. In one embodiment, a data container 107 and an associated dedup container 108 may be considered to be arranged in a cascade-type of arrangement.

A general container 106, as used herein, is a virtual storage space within the storage space 104 that may store, or hold, a key/value arrangement 105 of keys and values of user data. A general container 106 may be configurable by a user or by a system administrator.

A data container 107, as used herein, is a virtual storage space within the storage space 104 that may store, or hold, a key/dedup key arrangement 109 of keys and dedup keys. A dedup container 108, as used herein, is a virtual storage space that may store, or hold, a dedup key/metadata/user data block arrangement 110. As generally indicated by arrow 111, the dedup keys stored in a data container 107 point to corresponding metadata and a user data block that are stored in a dedup container 108. The deduplication functional arrangement between a data container 107 and the contents 109 of a data container 107, and a dedup container 108 and the contents 110 of a dedup container 108 are used by the device control unit 101 to provide deduplication functionality.

Figure 1B:
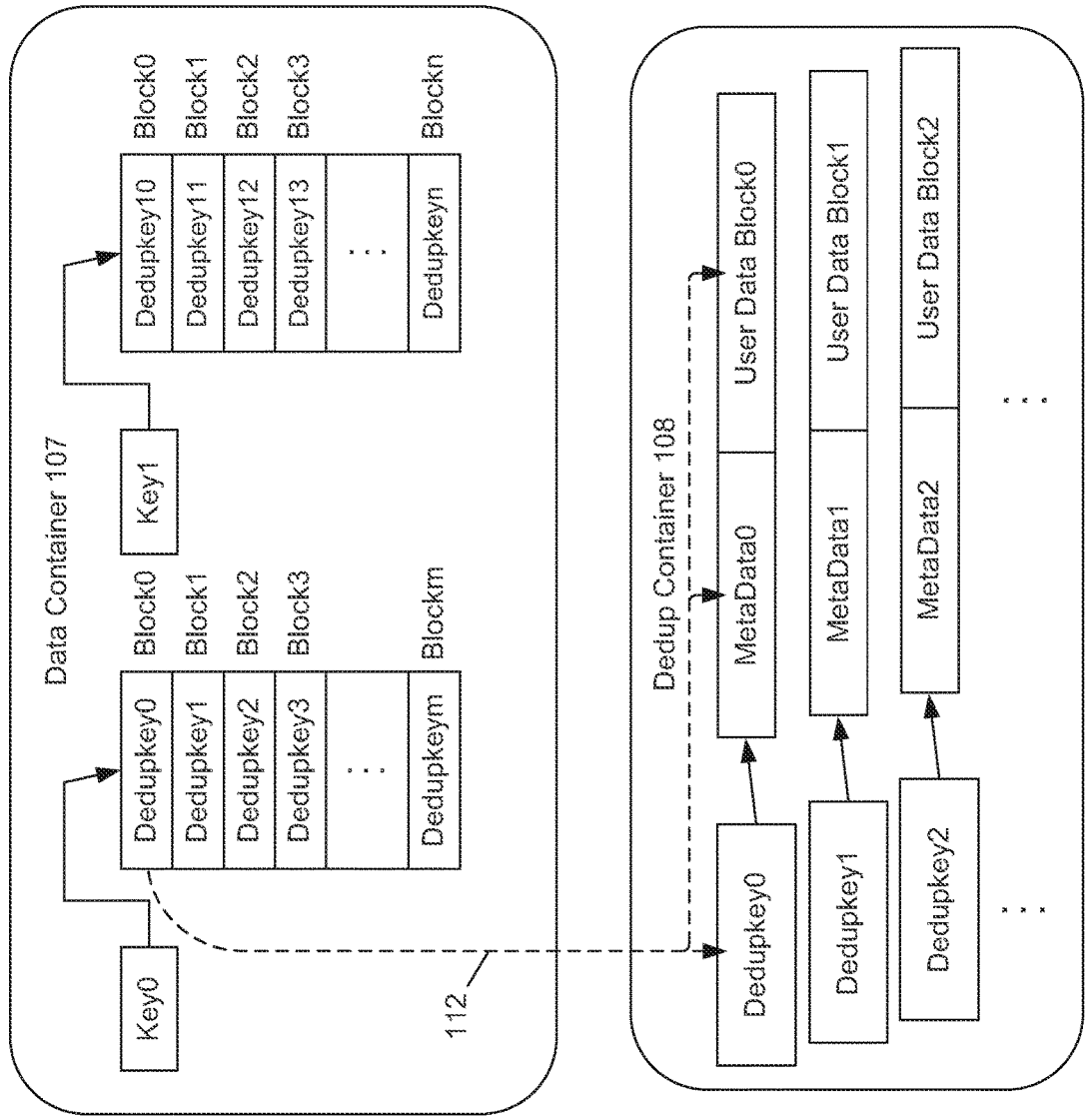
FIG. 1B depicts a more detailed block diagram of an example embodiment of the deduplication functional arrangement between a data container and a dedup container according to the subject matter disclosed herein.

FIG. 1B depicts a more detailed block diagram of an example embodiment of the deduplication functional arrangement between a data container 107 and a dedup container 108 according to the subject matter disclosed herein. When user data is received by the KVSSD 100, the device control unit 101 controls the hash unit 103 to generate a key for the received user data. As depicted in FIG. 1B, the device control unit 101 may control the hashing unit 103 to generate, for example, a Key0 for a first received user data. Similarly, a Key1 may be generated by the hashing unit 103 for a second received user data. The device control unit 101 may also control the hashing unit 103 to generate a dedupkey for each block of the received user data.

In one embodiment, a size of a block of user data that is used to generate a dedupkey may be fixed and may be of a size that provides a reasonable probability that a block of user data may be duplicated. That is, if the size of a block is relatively large, the probability of the block being duplicated becomes relatively small, whereas a relatively smaller block size increases the probability that a block may be duplicated. For example, in one embodiment, a block size may be 4K bytes. In other embodiments, the block size may be 8K bytes, 16K bytes, etc. In still another embodiment, the size of a block of user data may be user or administrator selectable.

In one embodiment, the hashing unit 103 may provide a fixed hashing function that may be, for example, installed at the factory. In another embodiment, the hashing unit 103 may include a field programmable gate array (FPGA) or other similar programmable device that may be user or administrator programmable so that the particular hashing function used for generating dedupkeys may be optimized for the particular application in which the deduplication functionality is being applied. In one embodiment, the programmability of the hashing unit 103 may be reprogrammable so that the deduplication functionality provided by the KVSSD 100 may be adaptable. The hashing function used to generate the key for a user data may be the same or may be different from the hashing function that may be used to generate dedupkeys.

A dedupkey is generated for each block of user data that is associated with a key, and is stored in a data container 107 in association with the key for the user data. For example, for a Key0, a dedupkey0 is generated for a user data block 0 of the first received user data. A dedupkey1 is generated for a user data block 1 of the first received user data, and so on. Similarly, for a Key1, a dedupkey10 is generated for a user data block 0 of the second received user data, and so on.

As generally indicated by arrow 112, each dedupkey points to corresponding metadata and a corresponding user data block that is stored in the dedup container 108. The metadata associated with a user data block may include, for example, a number of references that are made to the user data block by other dedup keys. That is, the metadata may indicate the number of references to the particular user block of data as part of the deduplication process for the data container/dedup container pair so that the block of data is not mistakenly deleted if there is an outstanding dedupkey reference. In one embodiment, metadata may be stored in the first 512 bytes of the records followed by the user data block. In another embodiment, the metadata may be stored after the user data block.

Figure 2:
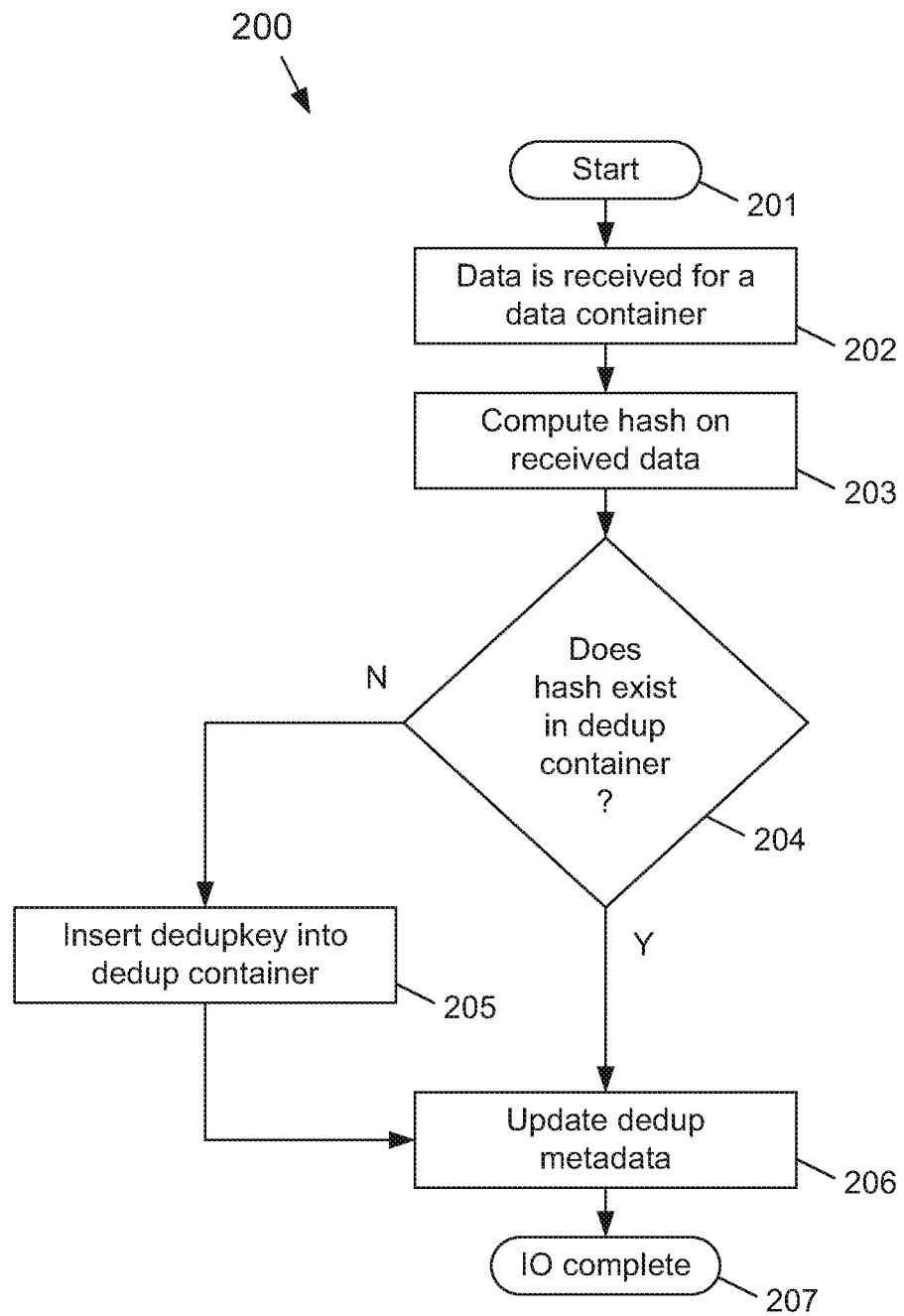
FIG. 2 depicts a flow diagram for a deduplication process according to the subject matter disclosed herein.

FIG. 2 depicts a flow diagram for a deduplication process 200 according to the subject matter disclosed herein. The process starts at 201. At 202, user data is received by the KVSSD 100 for a data container 107. At 203, the device controller 101 controls the hashing unit 103 to generate dedupkey for each block of the received user data. At 204, for each data block of the received user data, the device control unit 101 determines whether a dedupkey that has been generated for the block of received user data matches a dedupkey in the data container 107.

If, at 204, the device control unit 101 does not find a match, flow continues to 205 where the new dedupkey is stored in the data container 107, and flow continues 206 where metadata and the user data block are stored in the dedup container 108. Flow continues to 207 where the IO deduplication process is complete.

If, at 204, the device control unit 101 finds a match, flow continues to 206 where the metadata corresponding to the matching dedupkey is updated in the dedup container 108 to include a reference to the matching user data block. Flow continues to 207 where the IO deduplication process is complete.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A device, comprising:
   a storage space configured to:
   store, in a first virtual space, a first key and at least one first dedup key associated with the first key, the first dedup key corresponding to a first portion of data, and
   store the first dedup key, and the first portion of data in a second virtual space,
   the device being configured to determine that a second portion of data is a duplicate of the first portion of data by determining that a second dedup key for the second portion of data matches the first dedup key;
   wherein the first dedup key stored in the first virtual space refers to the first portion of data stored in the second virtual space.

2. The device of claim 1, wherein the first virtual space comprises a first container and the second virtual space comprises a second container.

3. The device of claim 1, wherein the device further generates the first dedup key based on a user-selectable hashing function.

4. The device of claim 1, wherein a predetermined size of the first portion of data is user selectable.

5. A deduplication method for use on a device, the method comprising:
   storing, in a first virtual space, a first key and at least one first dedup key associated with the first key, the first virtual space comprising a memory space of the device, the first dedup key corresponding to a first portion of data; and
   storing, in a second virtual space, the first dedup key and the first portion of data; and
   determining that a second portion of data is a duplicate of the first portion of data by determining that a second dedup key for the second portion of data matches the first dedup key, wherein the first dedup key stored in the first virtual space refers to the first portion of data stored in the second virtual space.

6. The method of claim 5, further comprising updating metadata in the second virtual space that is associated with the first portion of data to indicate a number of references to the first portion of data.

7. The method of claim 6, further comprising determining that a third dedup key for a third portion of data does not match the first dedup key, storing in the first virtual space the third dedup key for the third portion of data, and storing in the second virtual space the third dedup key, and the third portion of data.

8. The method of claim 5, wherein determining that the second portion of data is a duplicate block of data stored in the second virtual space is performed internally to the device.

9. The method of claim 5, wherein the first virtual space comprises a first container and the second virtual space comprises a second container.

10. The method of claim 5, wherein the first dedup key is determined based on a user-selectable hashing function.

11. The method of claim 5, wherein metadata associated with the first portion of data is stored in the second virtual space and comprises a predetermined number of bytes.

12. The method of claim 11, wherein the predetermined number of bytes is 512 bytes.

13. The method of claim 5, wherein a size of a portion of data is user selectable.

14. A deduplication method for use on a device, the method comprising:
   storing, in a first virtual space in the device, a first dedup key corresponding to a first portion of data;
   storing, in a second virtual space in the device, the first portion of data, wherein the first dedup key stored in the first virtual space refers to the first portion of data stored in the second virtual space;
   determining that a second portion of data received by the device is a duplicate of the first portion of data stored in the second virtual space in the device by determining that a second dedup key generated for the second portion of data matches the first dedup key in the first virtual space, the second virtual space being separate from a first virtual space in the device, the first portion of data being stored in the second virtual space in association with the first dedup key; and
   updating, in the second virtual space, a number of references to the first portion of data based on the second dedup key matching the first dedup key.

15. The method of claim 14, wherein determining that the second portion of data received by the device is a duplicate of the first portion of data stored in the device is performed internally to the device.

16. The method of claim 14, wherein the first virtual space comprises a first container and the second virtual space comprises a second container.

17. The method of claim 14, further comprising determining the second dedup key based on a user-selectable hashing function.

18. The method of claim 14, wherein metadata associated with the first portion of data is stored in the second virtual space and comprises a predetermined number of bytes.

19. The method of claim 18, wherein the predetermined number of bytes is 512 bytes.

20. The method of claim 14, wherein a predetermined size of the first portion of data is user selectable.

* * * * *